United States Patent [19]

Katsuragawa et al.

[11] Patent Number: 5,319,549
[45] Date of Patent: Jun. 7, 1994

[54] METHOD AND SYSTEM FOR DETERMINING GEOMETRIC PATTERN FEATURES OF INTERSTITIAL INFILTRATES IN CHEST IMAGES

[75] Inventors: Shigehiko Katsuragawa, Chicago; Kunio Doi, Willowbrook, both of Ill.

[73] Assignee: Arch Development Corporation, Chicago, Ill.

[21] Appl. No.: 981,526

[22] Filed: Nov. 25, 1992

[51] Int. Cl.$^5$ .................. G06F 15/00; G06K 9/00
[52] U.S. Cl. ......................... 364/413.13; 382/6
[58] Field of Search ............... 364/413.13, 413.01; 382/6; 378/901, 401

[56] References Cited

U.S. PATENT DOCUMENTS 4,839,807 6/1989 Doi et al. .................. 364/413.01
4,851,984 7/1989 Doi et al. .................. 364/413.23

Primary Examiner—Roy N. Envall, Jr.
Assistant Examiner—Xuong Chung
Attorney, Agent, or Firm—Oblon, Spivak, McClelland, Maier & Neustadt

[57] ABSTRACT

A computerized method and system based on quantitative analysis of geometric features of various infiltrate patterns in chest images for the detection and categorization of abnormalities related to the infiltrate patterns. Chest images are digitized and a lung texture analysis is performed on a number of small regions of interest (ROIs) in order to determine a classification of normal or abnormal of the particular patient's lungs. If the lungs are determined as being abnormal, large ROIs with a 128×128 matrix are selected in order to cover the detected areas of abnormality. Overall background trend correction is then performed in these large ROIs using a 2D-surface fitting technique for isolation of the fluctuating patterns of the underlying lung texture. Opacities of interstitial infiltrates are identified from two processed images which are obtained by employing thresholding with a morphological filter and a line enhancement filter. Finally, ROIs are classified into nodular, reticular and/or reticulo-nodular patterns by measurement of parameters corresponding to the type of the abnormality pattern detected.

18 Claims, 16 Drawing Sheets

ORIGINAL IMAGE

TREND-CORRECTED IMAGE

BACKGROUND TREND
6TH-ORDER
POLYNOMIAL SURFACE

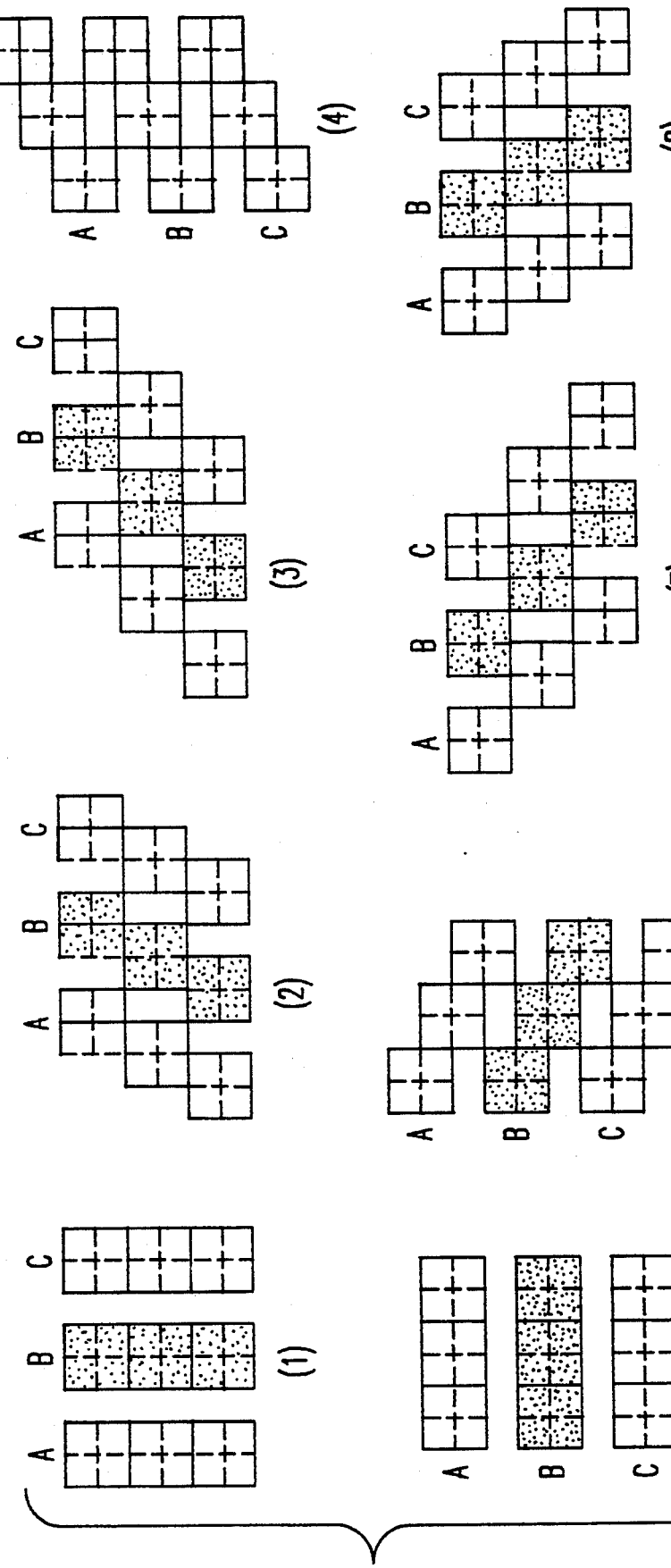

RETICULAR

RETICULONODULAR

NORMAL

NODULAR

LOOKUP TABLE L'

0 INDICATES THE ELEMENT NOT TO BE CALCULATED $$L'(p, q) = \Sigma\Sigma x^p y^q$$

METHOD AND SYSTEM FOR DETERMINING GEOMETRIC PATTERN FEATURES OF INTERSTITIAL INFILTRATES IN CHEST IMAGES

BACKGROUND OF THE INVENTION

1. Field of the Invention

The present invention is directed to a computerized method and system for analysis of chest radiographs to determine the presence or absence of interstitial lung disease and if interstitial disease is discovered, to classify the abnormalities on the basis of detected parameters related to the characteristics unique to a given abnormality type.

2. Discussion of the Related Art

In order to detect and characterize interstitial disease, there has recently been developed a computerized scheme, based on Fourier analysis techniques, for quantifying lung textures in digital chest radiographs. Such a method is disclosed in U.S. Pat. Nos. 4,839,807 and 4,851,984 both to Doi et al, the inventors of the present application. In this method, a conventional posterior-anterior (PA) chest radiograph is digitized with a drum scanner system employing a 0.1 millimeter pixel size and a 10-bit gray scale. Approximately 20 square regions of interest (ROIs) with a 64×64 matrix size are selected from the intercostal spaces. Manually interactive operations are needed in the ROI selection for the avoidance of ribs. A non-uniform background trend caused by the gross anatomy of the lung and chest wall is corrected by fitting a 2-dimensional surface to the original image in an ROI and subtraction of the fitted surface from the original image. Such a surface-fitting technique facilitates the determination of fluctuating patterns of the underlying lung texture for subsequent analysis and processing by a computer.

The root mean square (RMS) variation, also referred to as R, and the first moment of the power spectrum, commonly referred to as M, are then determined, by use of the two-dimensional Fourier transform, as quantitative measures of the magnitude and coarseness (or fineness), respectively, of the lung texture. The two-dimensional Fourier transformed data are defined in terms of a function $T(u,v)$ where u and v are spatial frequencies in a cartesian coordinate system. The function $T(u,v)$ is band-pass filtered by another function known in the art as the human visual response $V(u,v)$ as a means of suppressing low frequency and high frequency components, in order to enhance differences between normal and abnormal lungs.

From the filtered data $(T(u,v), V(u,v))$ the two texture measures R and M are obtained for each ROI. The ROIs are then classified as normal or abnormal on the basis of a comparison of these texture measures and a data base derived from clinical cases. The data base is obtained by determining average R and M values from lungs which were predetermined to be normal or abnormal. The normal lungs on average showed R values which were lower than those for abnormal lungs and M values which were higher. The results are displayed on a CRT monitor, providing a "second opinion" as an aid to radiologists in their interpretation.

This previous method was useful for distinguishing relatively obvious abnormal lung textures due to nodular, reticular and reticulo-nodular patterns. However, it became apparent in recent studies (Katsuragawa S, Doi K, MacMahon H, Nakamori N. Sasaki Y, Fennessy J. J.: quantitative analysis of lung texture in the ILO pneumoconioses standard radiographs, Radiographics Vol. 10, pp. 257–269, 1990) that the two texture measures R and M are not adequate to distinguish subtle abnormal lung textures due to various patterns, because the texture measures determined for round opacities were almost identical to those for irregular opacities. This result indicates the need for a new approach to the quantization and distinction of subtle texture patterns in chest images.

SUMMARY OF THE INVENTION

Accordingly, it is an object of the present invention to provide a computerized method and system for analyzing chest radiograph images in order to detect interstitial infiltrates and to classify the types of detected abnormalities on the basis of predetermined characteristics unique to each of the different abnormality types.

A related object is to employ the relative areas of lump and linear opacities detected from a chest radiograph image after filtering of the image as measurements for characterizing abnormalities of interstitial infiltrates as being either nodular, reticular or reticulo-nodular patterns.

A further object is to provide a nonuniform background trend correction technique for performing background trend correction on a surface represented by a polynomial function of any order, by employing a least squares method which significantly reduces the computation time of a microprocessor in performing the background trend correction.

A further object of the invention is to provide a method and system for computerized analysis of medical images by performing first and second types of filtering to a digitized image including morphological filtering and line enhancement filtering in order to determine locations on the image corresponding to either lump or linear opacities and to eliminate linear opacities which overlap with lump opacities, in order to determine the types of abnormalities in the image.

The present invention achieves the foregoing objects by providing a computerized method and system which uses quantitative analysis of geometric features of various interstitial infiltrate patterns in chest radiograph images. The analysis is concerned with the detection and classification of abnormalities on the basis of determined characteristics of the abnormalities and comparison with predetermined data related to different categories of abnormalities. The different categories of abnormalities commonly found in chest radiograph images exhibiting interstitial infiltrates include nodular, reticular and/or reticulo-nodular patterns. These different pattern types which appear on the radiograph images exhibit different characteristics which are predetermined by clinical observation and stored in memory for eventual comparison with data to be analyzed corresponding to a given patient's chest radiograph image or images.

In the method and system of the invention, a chest radiograph image is digitized and divided into a number of regions of interest (ROIs) which are subsequently analyzed to detect lump or linear opacities on the image which may indicate the presence of interstitial disease. A background trend corrected image is then applied with two types of filtering in order to enhance the presence of lump and linear opacities. Any linear opacities which are found to overlap with the detected lump opacities are eliminated, and then calculations are performed on the remaining lump and linear opacities for categorization on the basis of the calculations into nodular, reticular or reticulo-nodular patterns. The computerized method and system indicate the type of abnormal patterns detected on a patient's radiograph image and thereby provide the radiologist with a valuable verification source of his or her initial diagnosis concerning the extent and/or progress of a patient's possible lung disease, and thus provides a useful way to reduce the possibility of an incorrect diagnosis.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 illustrates the various template arrangements for use in the line enhancement filtering technique used in the detection of linear opacities;

FIG. 9 illustrates enlarged chest radiograph images for normal and abnormal lungs;

FIG. 12 shows another lookup table L' which is an improvement over the lookup table of FIG. 11.

DETAILED DESCRIPTION OF THE PREFERRED EMBODIMENTS

Figure 1:
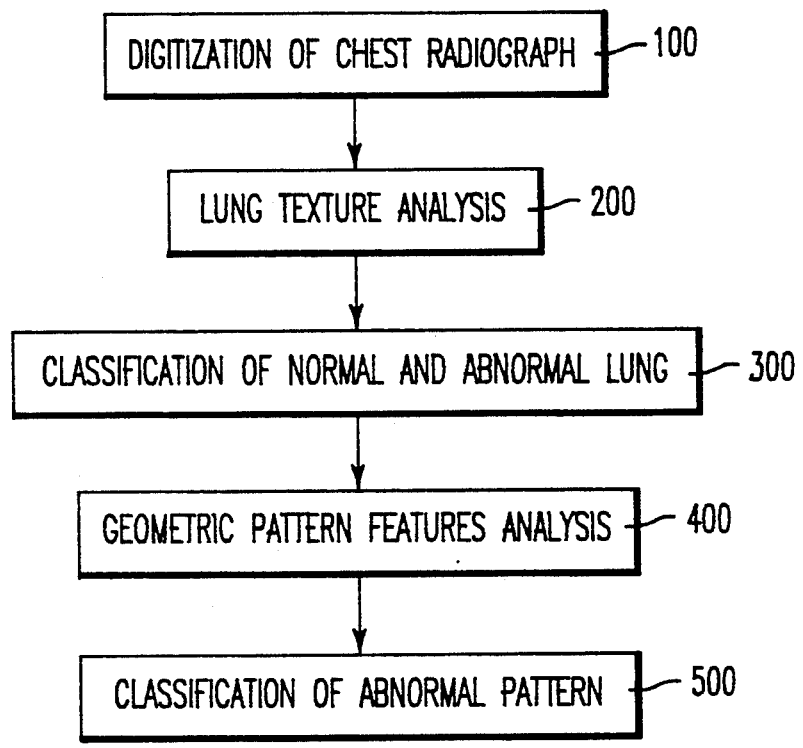
FIG. 1 shows the basic concept of the overall scheme of the computer-aided diagnosis technique for the detection of interstitial infiltrates in chest radiograph images.

Referring now to the drawings, wherein like reference numerals designate identical or corresponding parts throughout the several views, and more particularly to FIG. 1 thereof, the overall scheme of the computer-aided diagnosis for detection and characterization of interstitial lung disease based on chest radiographs is shown. First, a conventional chest radiograph is digitized with a laser scanner at a pixel size 0.175 mm and 1024 gray levels (10-bit quantization) in step 100. Regions of interests (ROIs) with interstitial infiltrates in lung fields of chest images are detected by using the lung texture analysis (step 200) based on the Fourier transform of texture patterns and the classification of normal and abnormal lungs (step 300), which techniques have been developed previously, as disclosed in U.S. Pat. Nos. 4,839,807 and 4,851,984, the teachings of which are incorporated herein by reference. Reference is also made to the teachings of copending U.S. application Ser. No. 07/843,721 filed on Feb. 28, 1992 by Doi et al. The matrix size of the ROI for the initial detection of abnormal areas is relatively small such as 16×16 or 32×32. Geometric feature analysis (step 400) according to the invention is applied to the ROIs in detected abnormal regions in order to characterize the nature of abnormalities of interstitial infiltrates such as nodular, reticular and reticulo-nodular patterns (step 500).

Figure 2A:
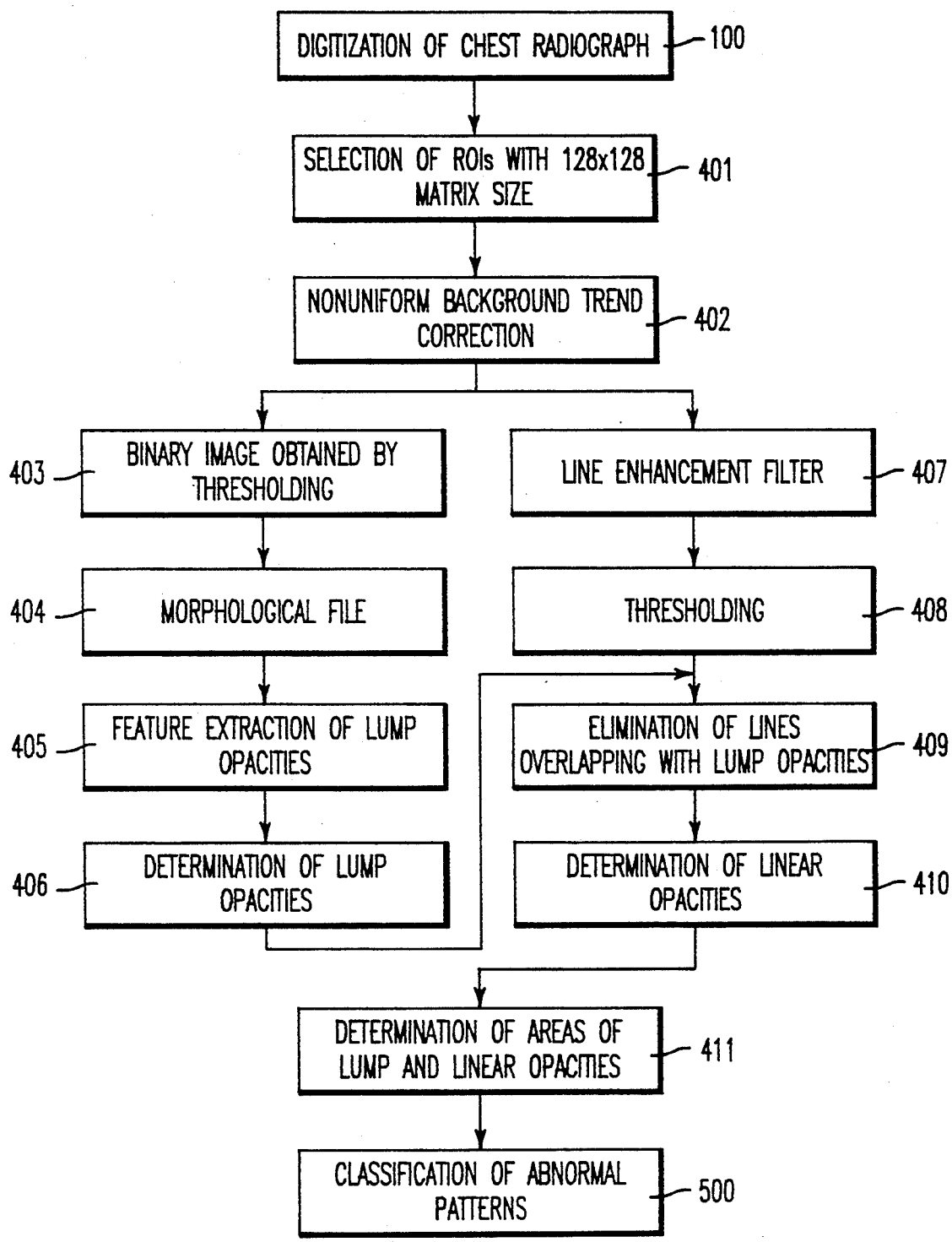
FIG. 2A illustrates the overall method of the geometric pattern feature analysis technique in accordance with the invention.
Figure 3A:
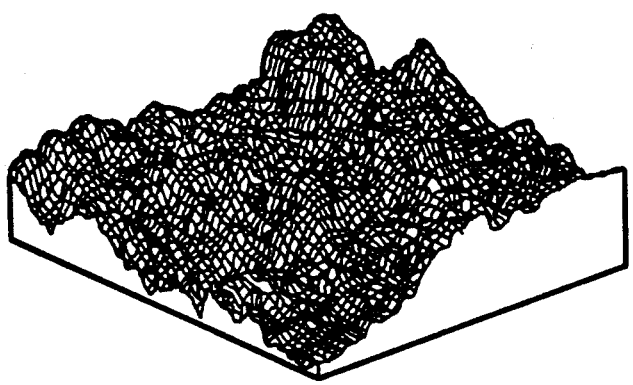
FIGS. 3(a-c) illustrate the basic concept of applying a background trend correction to the non-uniform structure of an original image, and the trend corrected image for a 6th-order polynomial surface after background trend correction has been applied.
Figure 3B:
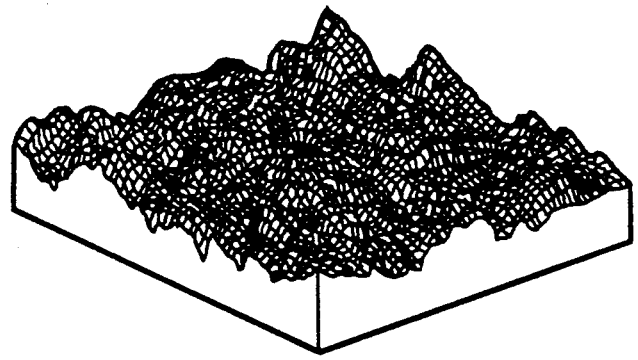
Figure 3C:
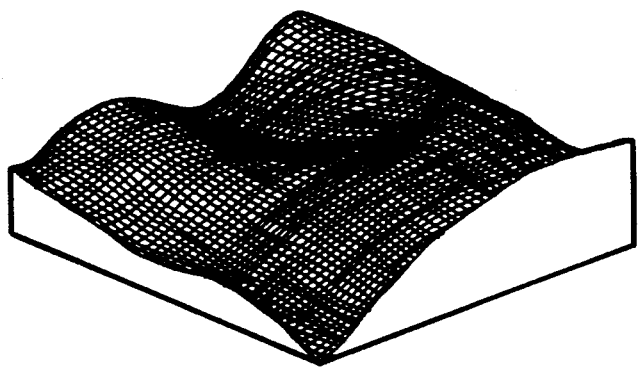

The overall method for the geometric pattern feature analysis according to the invention is shown in FIG. 2A. Large ROIs with a 128×128 matrix size are selected (step 401), covering all abnormal regions identified by the lung texture analysis on small ROIs, step 200 above. For an isolated abnormal region, the center of the large ROI is selected at the center of the small isolated ROI. However, when multiple abnormal ROIs are located closely together, one or more large ROIs are selected to cover all of the small abnormal ROIs. Nonuniform background trend (step 402) in these large ROIs is due to normal lung structure and the variation in chest wall thickness, and is corrected using a 2D-surface fitting technique with a 6th-order polynomial surface, for example, in order to isolate the fluctuating patterns of the underlying lung texture, as shown in FIGS. 3(a-c). Pixel density variations in a selected ROI will show gradual variations in density due to the fact that the chest wall itself will have variations and also because normal structures may be overlapped with each other. Removal of this background structure results in the isolating of the fluctuating patterns, i.e., the substraction process using background trend correction is performed.

Figure 2B:
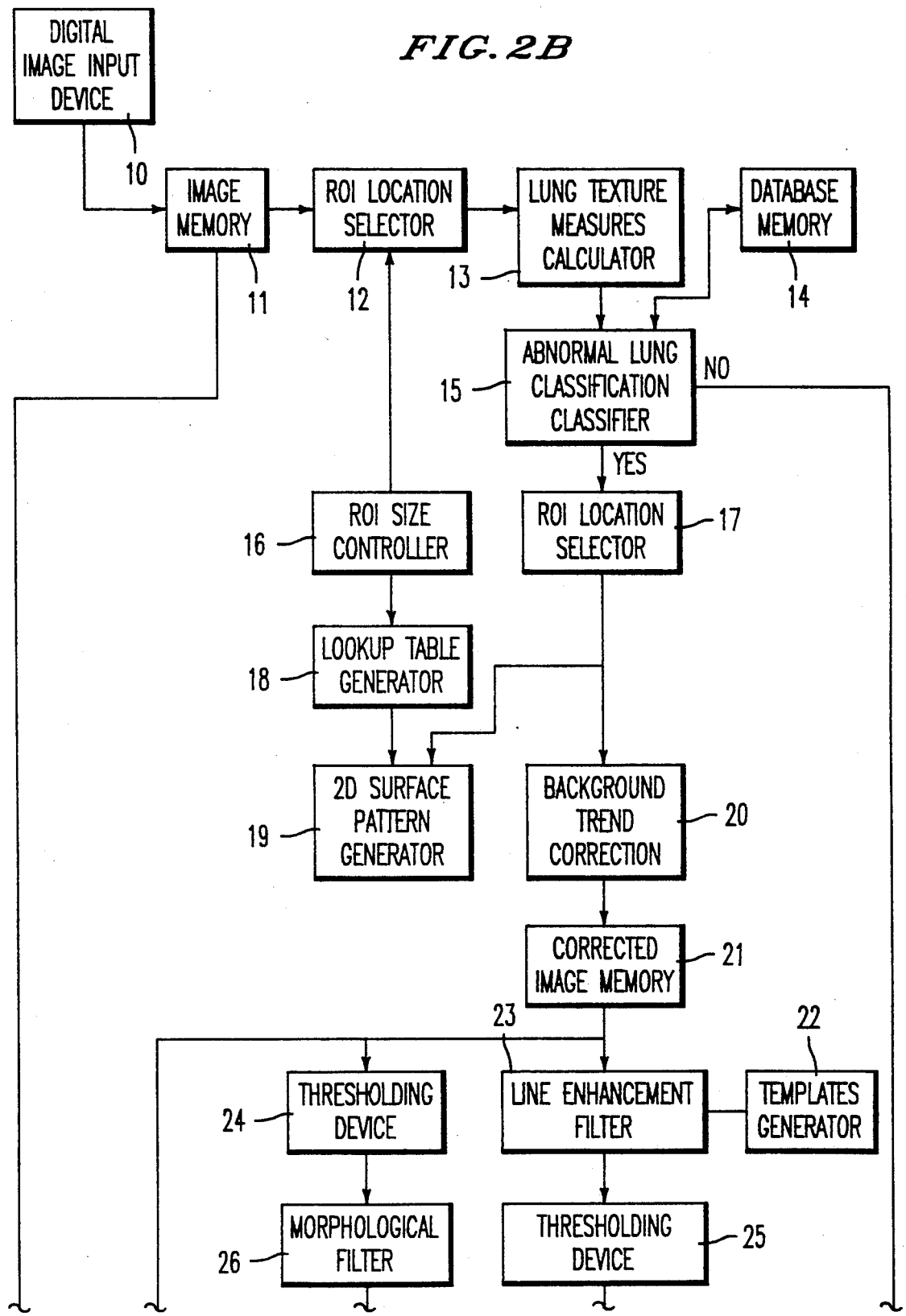
FIGS. 2(B-C) are schematic block diagram illustrating the system according to the invention.
Figure 2C:
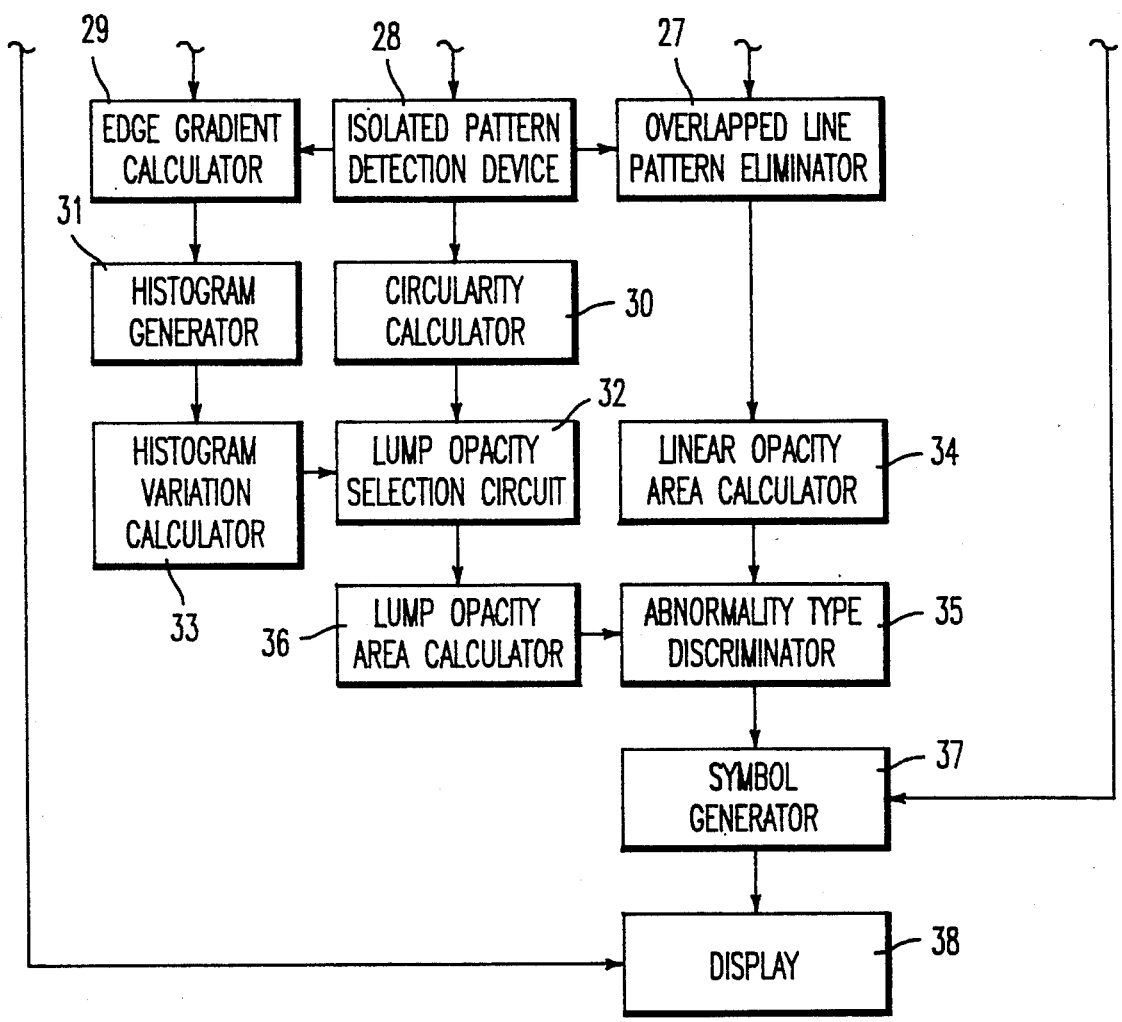

FIG. 2(B-C) illustrates a schematic diagram of the overall system according to the invention. An image memory 11 receives input from digital image input device 10 and then outputs data stored therein to ROI location selector 12 and also to display 38. The ROI location selector 12 determines the regions to be analyzed after receiving an output from ROI size controller 16. As shown, the output of ROI location selector 12 is received by lung texture measures calculator 13 in which the texture measurements described above are performed. Based on these lung texture measurements, classifier 15 determines whether the lung is normal or abnormal by comparison of the texture data with predetermined threshold data stored in database 14. If the result of comparison is that the lung is normal, classifier 15 outputs this information to symbols generator 37 which outputs an indication of this fact to display device 38. If, however, the lung is classified as being abnormal, large ROIs are selected in selector 17 with their size controlled by ROI size controller 16.

A lookup table generator 18 stores previously calculated values for use by pattern generator 19, as will be described in greater detail below, in order to carry out the background trend correction in element 20. The output of the background trend correction is received by memory 21 and stored therein. From memory 21, the background trend corrected image data is output simultaneously to edge gradient calculator 29, thresholding device 24 and line enhancement filter 23. From the output of edge gradient calculator 29, a histogram generator creates the histograms corresponding to the detected opacities in the chest images. A histogram variation calculator 33 then outputs a value to lump opacity selection circuit 32. The thresholding device 24 outputs a value to morphological filter 26 which performs the morphological filtering on the background trend corrected image. Isolated pattern detection device 28 receives an output from the morphological filter 26 and simultaneously outputs the detected isolated patterns to edge gradient calculator 29, circularity calculator 30 and line overlapping pattern eliminator 27.

Figure 7:
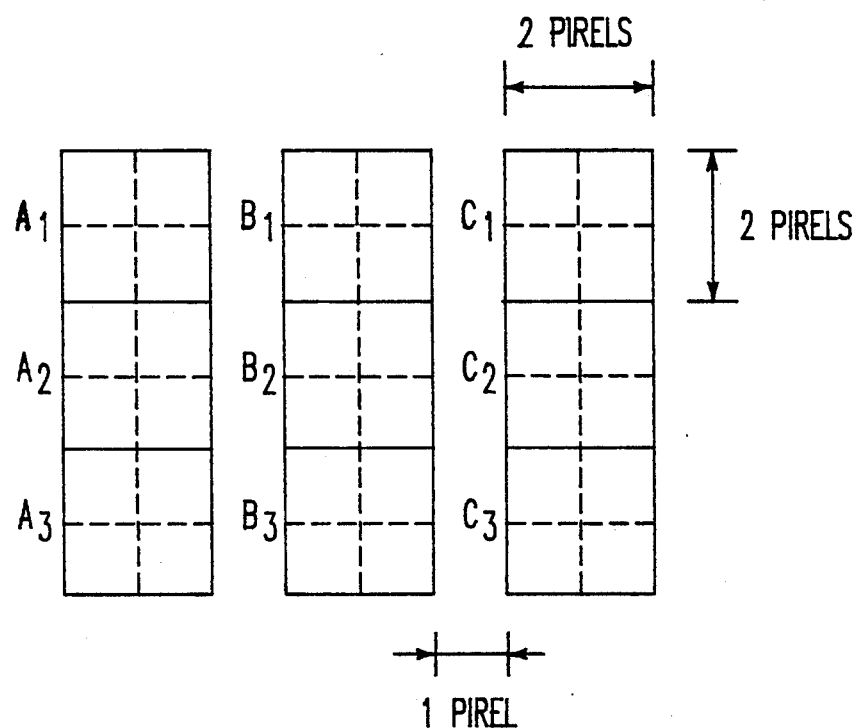
FIG. 7 illustrates an enlargement of template (1) of FIG. 6.

The line enhancement filter outputs data corresponding to line enhancement of the background trend corrected image for thresholding of the enhancement image in thresholding device 25. In order to perform the line enhancement, a templates generator 22 provides the templates having the different orientations as shown in FIGS. 6 and 7. Lump opacity area calculator 36 and linear opacity area calculator 34 determine the ratios between the areas of the detected opacities to the large size ROIs which include these opacities. The outputs of these two calculators 34, 36 are then received by abnormality type discriminator 35 which determines the types of abnormalities as being either nodular, reticular or reticulo-nodular. The output of discriminator 35 is then received by symbols generator 37 which outputs the appropriate symbols corresponding to these different types of abnormalities to display device 38 which has received the original image memory from memory 11.

It is known from Fraser, Pare JAP "Diagnosis of Diseases of the Chest", Sanders, Philadelphia, Pa., 1970, that interstitial infiltrates are basically composed of lump and linear opacities. Therefore, lump and linear opacities of interstitial infiltrates are identified from two processed images which are obtained by using a morphological filter and a line enhancement filter. To detect lump opacities, a series of binary images are obtained by thresholding the trend corrected image (step 403) with a threshold level which varies from 5 to 25 pixel values at an increment of 5 pixel values, for example. Thresholding refers to analysis of the pixel data, i.e., whether the values are above or below predetermined values. The maximum and minimum threshold levels are determined based on the peak pixel value in the trend corrected image. In order to remove border details and to fill small holes of the extracted opacities obtained after thresholding, binary images are processed by using an open operation and a closed operation which are basic morphological filtering techniques (step 404), as disclosed in, for example, Yoshimura H., Giger M. L., Doi, K, MacMahon H, Montner S. M., "Computerized Scheme for Detection of Pulmonary Nodules: Nonlinear filtering Technique," *Invest. Radiology*, Vol. 27, pp. 124–129, 1992. However, extracted opacities include rib edges and large vessels besides lump opacities due to interstitial infiltrates. Therefore, it is necessary to be able to distinguish lump opacities from other opacities which result from rib edges, large vessels or other artifacts.

Figure 4:
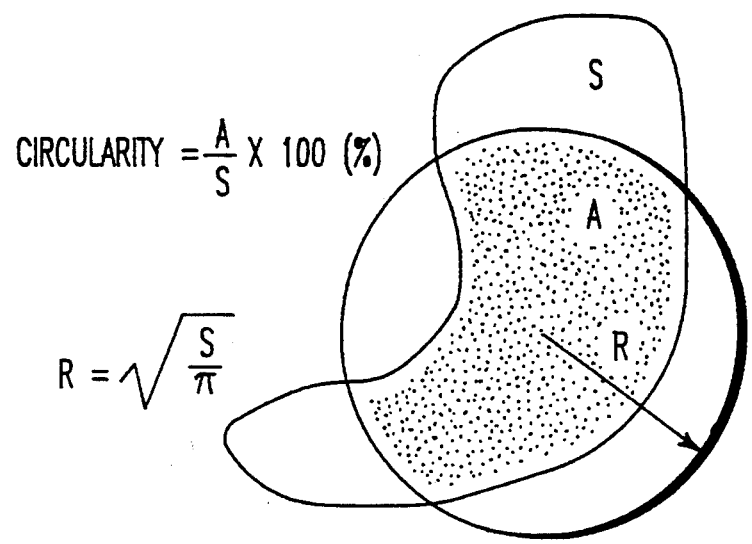
FIG. 4 illustrates the manner by which the circularity of a lump opacity is calculated.

To identify lump opacities, such parameters as circularity of the opacities and nonuniformity of the distribution of the edge gradient orientation in opacities are employed. The circularity of an extracted opacity is defined as the fraction of the area of the extracted opacity within the circle having the same area as that of the extracted opacity, as shown in FIG. 4. In general, the circularity of the extracted opacities at a low threshold level is lower than that extracted at a high threshold level because opacities will commonly be merged with each other at low thresholding levels. In addition, the circularity of lump opacities with interstitial infiltrates is usually higher than those of rib edges and large vessels at any threshold level. Therefore, opacities with a circularity of 0.3 or greater at a threshold level of 5 pixel values and also a circularity of 0.6 or greater at a threshold level of 10 pixel values or greater are classified as lump opacities due to interstitial infiltrates.

Figure 5A:
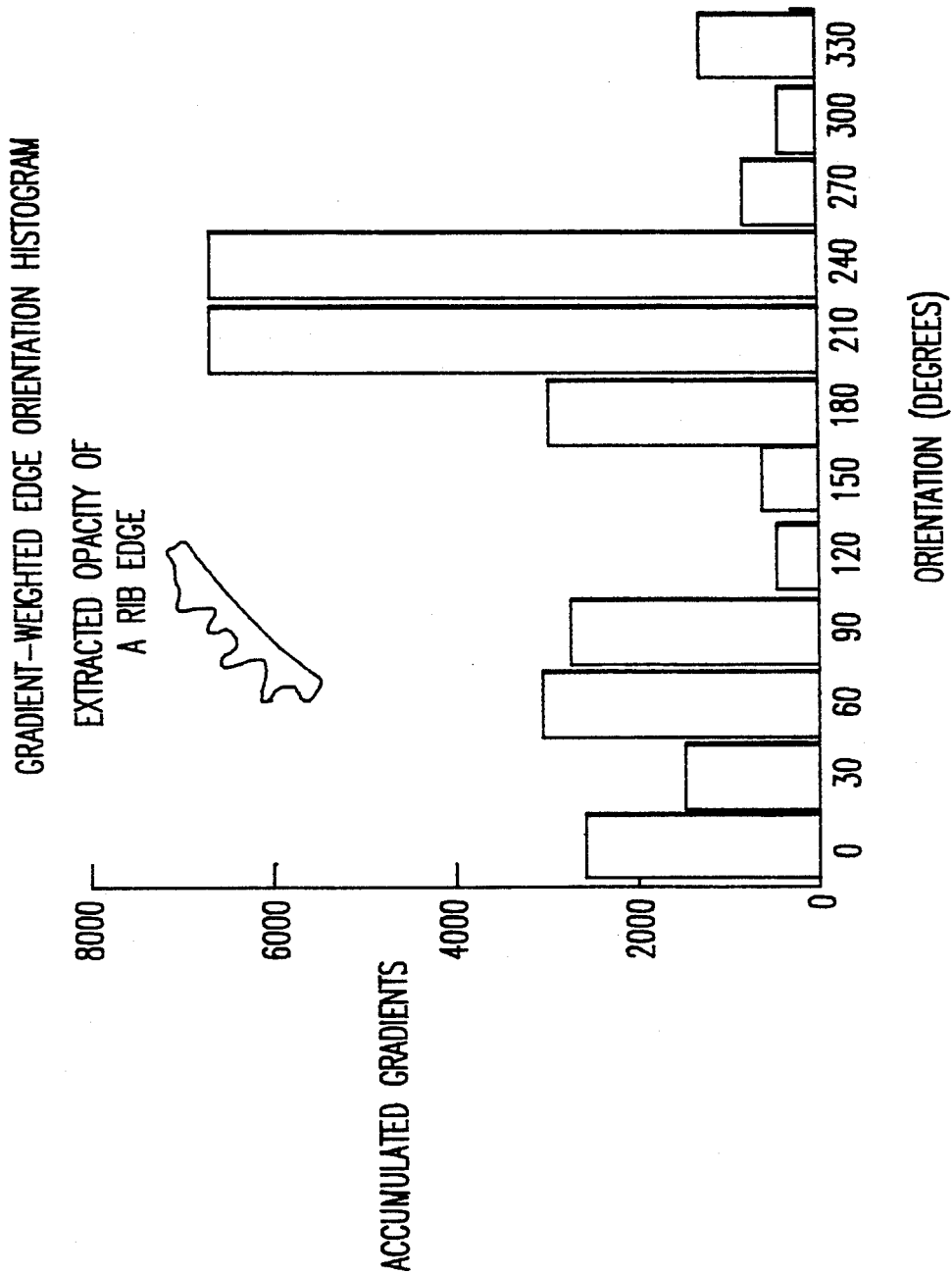
FIG. 5a illustrates a gradient-weighted edge orientation histogram of a rib edge.
Figure 5B:
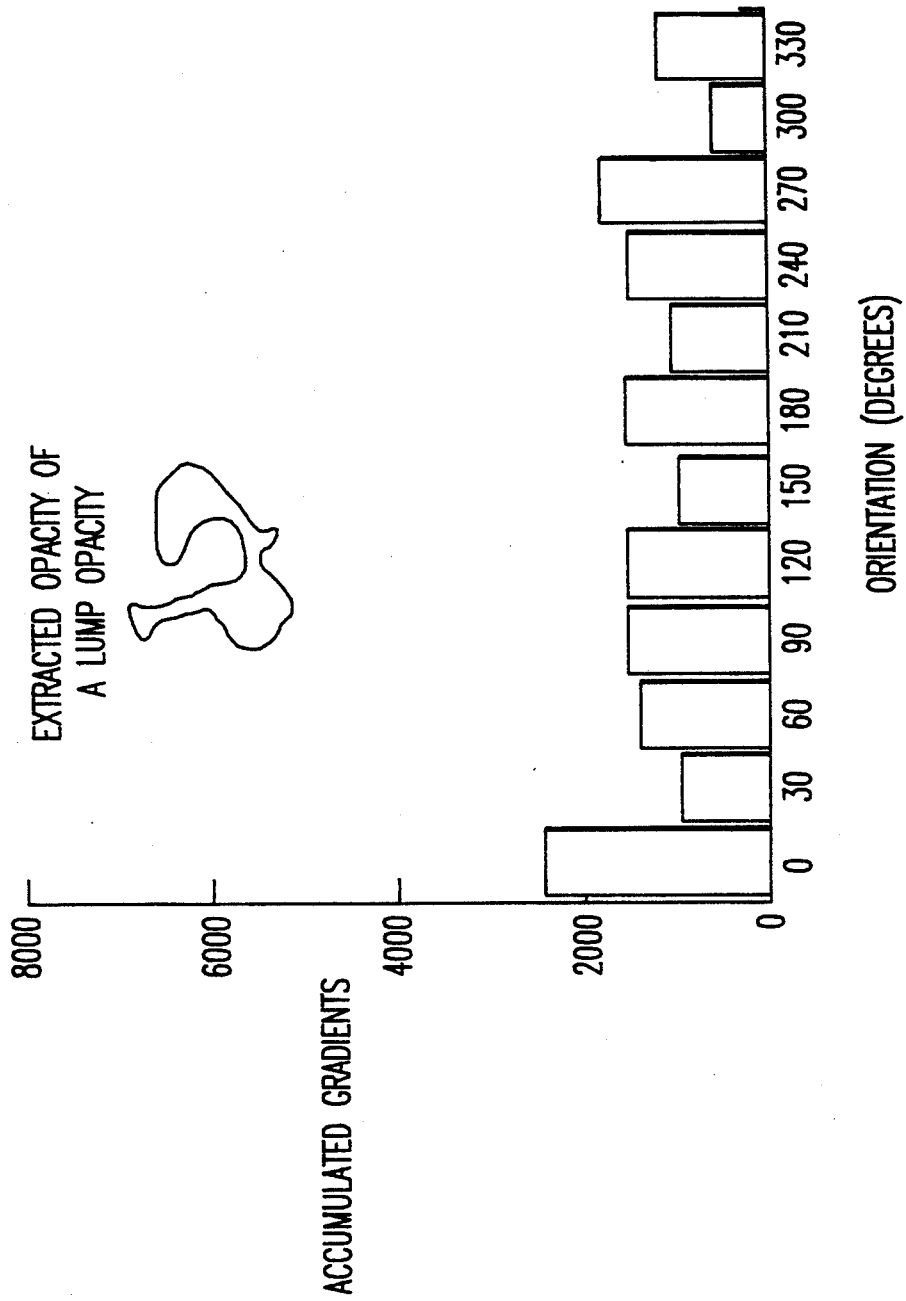
FIG. 5b shows a gradient-weighted edge orientation histogram in the region of a lump opacity.

The gradient-weighted edge orientation histogram analysis described in copending U.S. application Ser. Nos. 07/617,080 now abandoned and 07/843,715 now U.S. Pat. No. 5,289,374 is used for further identification of lump opacities. The edge gradient and its orientation are obtained by using a Sobel operator at each pixel along the border of the extracted opacity at a threshold level equal to 10 pixel values. Then, a gradient-weighted edge orientation histogram is obtained by accumulation of gradient values at each orientation interval. FIGS. 5(a) and (b) show the gradient-weighted edge orientation histograms for a rib edge and a lump opacity due to interstitial infiltrates, respectively. It is clear from these figures that the variation of the accumulated gradients in the histogram for a rib edge is much larger than that for a lump opacity. The relative standard deviation of the accumulated gradients in the histogram, which corresponds to the standard deviation divided by the average gradient, indicates the magnitude of the variation of the histogram, and thus it is used as a measure for identifying lump opacities with interstitial infiltrates, i.e., opacities with more than 0.80 of the relative standard deviation are classified as rib edges or large vessels. The above described feature extraction techniques are carried out in step 405. From these values, the opacities can be determined to be lump opacities or other types of opacities, step 406.

Linear opacities are detected by applying a line enhancement filter (step 407) to the trend-corrected image. The line enhancement filter is composed of eight templates corresponding to eight directions of possible orientations of the lines to be detected, as shown in FIG. 6. For example, the enlarged template No. 1 is shown in FIG. 7. The output value of this template, $E_1$, is defined as follows:

$$E_1 = \begin{cases} 2B - A - C & \text{(if and only if } B > A \text{ and } B > C) \\ 0 & \text{(otherwise)} \end{cases},$$

where $$A = \sum_{i=1}^{3} A_i, B = \sum_{i=1}^{3} B_i, C = \sum_{i=1}^{3} C_i.$$

$A_i$, $B_i$ and $C_i$ are average pixel values from four pixels, respectively, included in solid squares in order to reduce the effect of radiographic noise. The final output value of the line enhancement filter for a pixel in question, E, is determined by the maximum value among eight Es calculated as follows;

$$E = \text{Max}\{E_1, E_2, E_3, E_4, E_5, E_6, E_7, E_8\}.$$

The low contrast lines and short lines are eliminated by thresholding the filter output value (step 408) and also the length of the detected line pattern, respectively. Some lines extracted by the line enhancement filter are overlapped with the lump opacities detected previously. This is because some lump opacities tend to produce sharp line patterns along edges of lump opacities. Therefore, linear opacities due to interstitial infiltrates are finally identified (step 410) by eliminating the line patterns which overlap with lump opacities (step 409).

Abnormal patterns of interstitial infiltrates are then analyzed by determining the total areas of lump and linear opacities, which are used as measures indicating the nature of different opacities (step 411). If the nodular patterns are mainly included in a ROI, the areas of lump opacities are relatively large. On the other hand, if the reticular patterns are dominant in a ROI, the areas of the lump opacities will be smaller than those for the nodular patterns and the areas of linear opacities will be larger than those of lump opacities. The areas of both lump and linear opacities are generally large in a ROI with reticulo-nodular patterns. Therefore, the particular type of lump opacity can be determined by the automated detection scheme of the invention based on the foregoing parameters. Note also that the areas of both lump and linear opacities for normal lungs are very small compared with those for abnormal lungs.

As discussed above, two filtering approaches are used to independently detect the two types of opacities, linear and lump. However, some lump opacities (aggregates of increased density) will include opacities similar to linear opacities. Therefore, with the line enhancement filter, some portions of the lump opacities will show linear opacities, so only those "linear" opacities which overlap the lump opacities will eliminated. However, there will be other independent linear opacities detected by the line enhancement filtering which do not overlap with the lump opacities. These true linear opacities will then be analyzed similarly to the lump opacities.

Figure 8C:
FIG. 8c illustrates an output image after elimination of rib edges and large vessels.
Figure 8F:
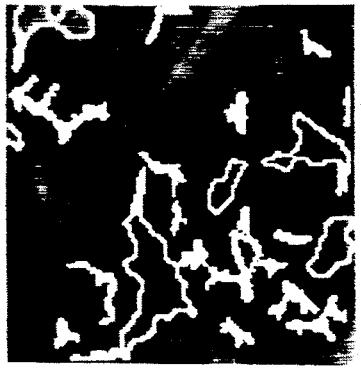
FIG. 8f illustrates the final display of lump and linear opacities detected according to the computerized pattern feature analysis technique of the invention.
Figure 8B:
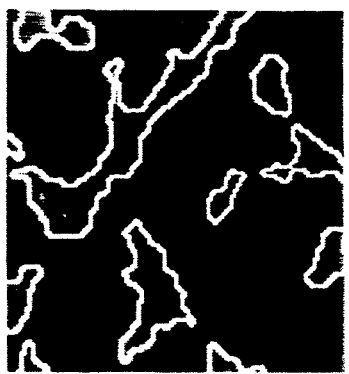
FIG. 8b shows a computerized output image showing the contours of a binary image obtained by thresholding and morphological filtering.
Figure 8E:
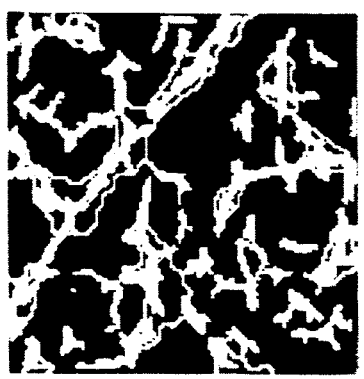
FIG. 8e illustrates an output of the line enhancement filter together with detected lump opacities.
Figure 8A:
FIG. 8a illustrates an original image with reticulo-nodular patterns.
Figure 8D:
FIG. 8d show the output of a line enhancement filtering technique in accordance with the computerized geometric pattern feature analysis of the invention.
Figure 9C:
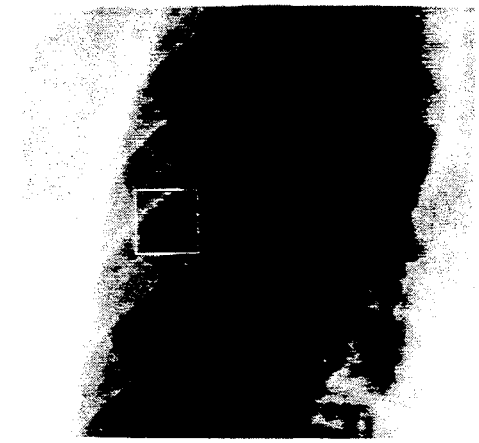
FIG. 9c illustrates reticular patterns.
Figure 9D:
FIG. 9d illustrates reticulo-nodular patterns.
Figure 9A:
FIG. 9a illustrates a normal lung.
Figure 9B:
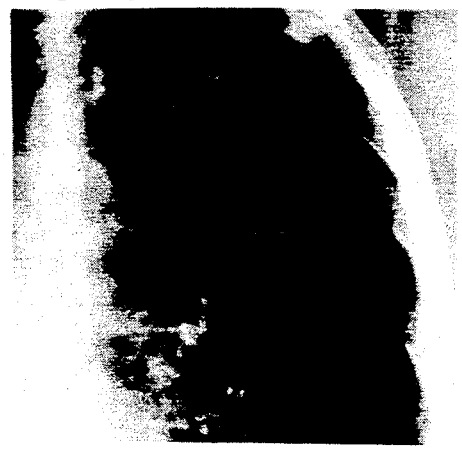
FIG. 9b illustrates nodular patterns.

The above described computerized method was applied to the analysis of geometric pattern features in actual clinical cases. FIGS. 8(a)–(f) show computer output images at several stages of the method. FIG. 8(a) shows an original image with reticulo-nodular patterns. FIG. 8(b) shows contours of a binary image obtained by thresholding (threshold pixel values=10) and using a morphological filter with a 3×3 square kernel. The rib edges and large vessels were eliminated after determination of the circularity of opacities and the characteristics of the edge gradient histogram, as shown in FIG. 8(c). The output of the line enhancement filter is shown in FIG. 8(d). FIG. 8(e) illustrates overlap of line patterns with lump and other opacities such as rib edges which are detected in FIG. 8(b). FIG. 8(f) shows the final output image indicating the mixture of lump and linear opacities. It is clear from the results that most lump and linear opacities due to interstitial infiltrates will be able to be detected after elimination of rib edges.

Figure 10:
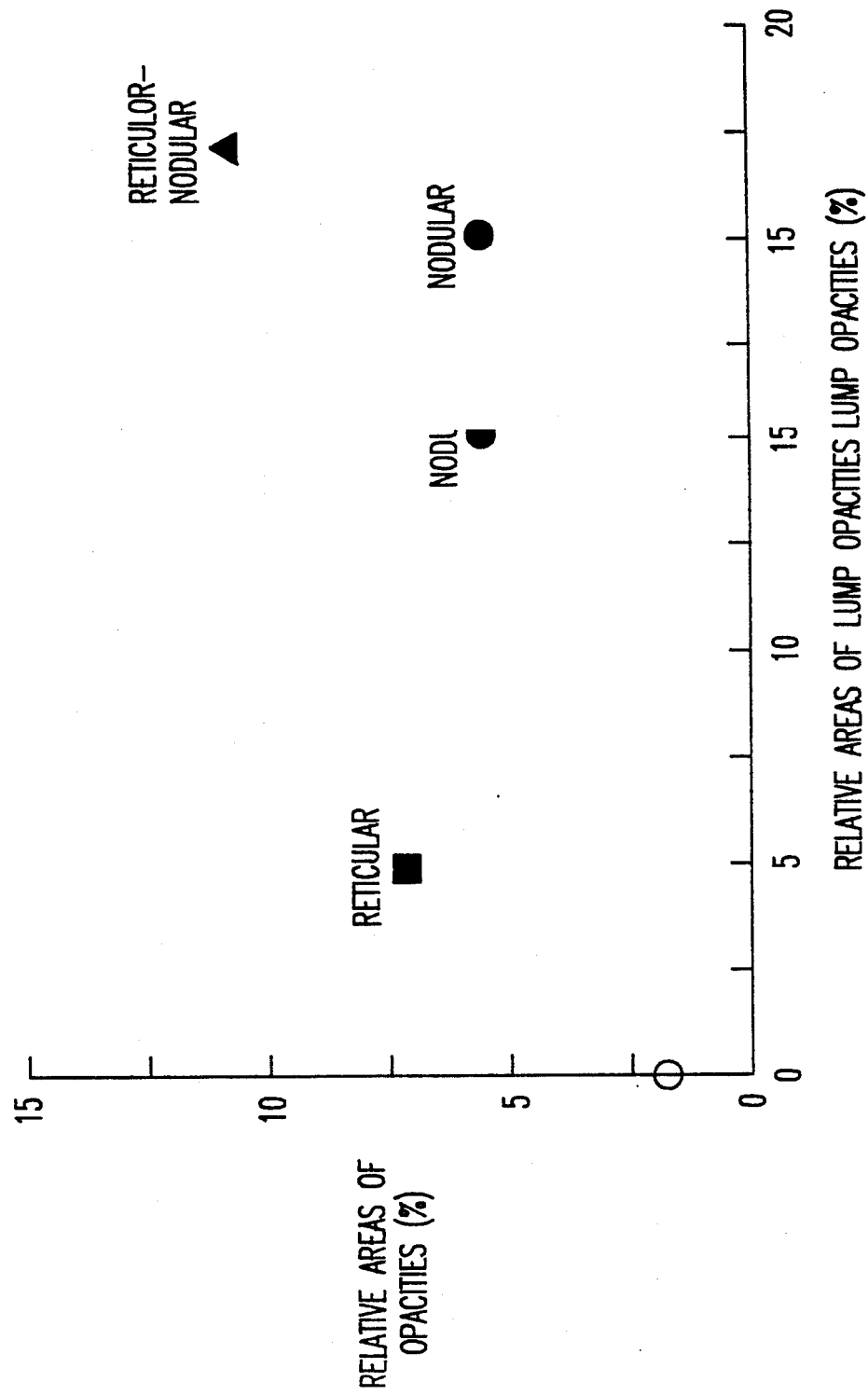
FIG. 10 shows corresponding measures obtained in accordance with the inventive scheme.

FIGS. 9(a)–(d) illustrate portions of enlarged chest images of one normal and three abnormal lungs with nodular, reticular and reticulo-nodular patterns. Only one ROI for each chest image was selected for this comparison. The corresponding measures for geometric pattern features are shown in FIG. 10. The relative areas of lump and linear opacities are defined as the fraction of total areas of lump and linear opacities, respectively, occupied in an ROI containing the lump and/or linear opacities. It is apparent that the nodular pattern has a large relative area of lump opacities, whereas the reticular pattern has a small relative area of lump opacities and its relative area of linear opacities is significantly larger than that of the normal lung. The reticulo-nodular pattern shows large relative areas of lump and linear opacities. These results indicate that these two measures for geometric pattern feature can distinguish three different types of abnormal patterns due to interstitial infiltrates involved in chest images.

A new technique for performing nonuniform background trend correction for a surface represented by a polynomial of any order has also been achieved for use in the present invention as a way of considerably decreasing the calculation time of the computer in carrying out the automated trend correction of the nonuniform background variations which exist in the radiograph images. This new method of background trend correction will be described in detail below.

It is known that the variation in optical density observed in the lung field consists of both that due to the gross anatomy of the lung and chest wall (background) and that due to the fine underlying texture which is related to interstitial disease. Thus, it is important to be able to isolate underlying density fluctuations from the apparent overall lung texture. In this computerized geometric feature analysis, relatively large ROIs with a 128×128 matrix size (22.4 mm×22.4 mm on film) are employed, and consequently, the nonuniform background trend has to be estimated using a higher-order 2D polynomial surface than that used for performing the texture analysis in step 200 of FIG. 1. For this purpose, the present invention uses an improved technique for performing nonuniform background trend correction with any order polynomial surface by employing a least-square method.

In the past, as described in U.S. Pat. Nos. 4,839,807 and 4,851,984, second-order or third-order two-dimensional polynomial surface fitting technique was employed. With this previous technique, between six and ten coefficients of the second-order or third-order polynomial surface, respectively, were calculated based on the least squares method. Since the number of coefficients needed for a higher-order two-dimensional polynomial surface increases rapidly as the order of the polynomial surface increases, it had been very difficult and time consuming using the previous technique to determine all of the necessary coefficients. However, when the size of the ROI is relatively small, such as 32×32 or 64×64, it was not necessary to employ a higher-order polynomial surface beyond the third-order polynomial surface because the variations in the background trend are relatively smooth. Since the background trend becomes more complex as the ROI size increases, it is necessary to use a higher-order polynomial surface. In the present invention, a general solution for coefficients of higher-order polynomial surfaces has been obtained, as well as an efficient method for obtaining all of the coefficients. With this new technique, the background trend correction can be applied for quantitative and qualitative analysis of many different types of medical images obtained from conventional radiography, digital radiography, computed tomography, magnetic resonance imaging, ultrasound imaging and nuclear medical imaging.

The unique aspects of the higher order two-dimensional polynomial fitting is that for a large area, in terms of distinction between the nodular, reticular-nodular and reticular, relatively large ROIs are used, and therefore the density variation in the background trend can be quite complex. For a small ROI, e.g., 32×32 or 16×16 size, density change will be relatively gradual. Thus, low order polynomial fitting will be adequate. However, for large ROIs (128×128 size) these areas may include ribs or other large vessels such as the heart or shadows thereof. Therefore, the fitting function surface must be complex in order to match these relatively complex variations in density. Therefore, a higher order polynomial function is required.

A general form of an nth-order polynomial surface, $F(x,y)$, at location $(x,y)$ is defined as follows, $$F(x,y) = a_1 + \qquad\qquad\qquad (1)$$
$$a_2 x + a_3 y +$$
$$a_4 x^2 + a_5 xy + a_6 y^2 +$$
$$a_7 x^3 + a_8 x^2 y + a_9 xy^2 + a_{10} y^3 + \ldots +$$
$$\frac{a_{n(n+1)}}{2} + 1^{xa} + \frac{a_{n(+1)}}{2} + 2^{xn-1} + \ldots +$$
$$\frac{a_{(n+1)(n+2)}}{2} - 1^{xy^{n-1}} + \frac{a_{(n+1)(n+2)} xy^n}{2}$$
$$= \sum_{k=1}^{n+1} \sum_{m=1}^{k} = \frac{a_{(k-1)k}}{2} + m x^{k-m} y^{m-1},$$

where $a_i$ indicates the coefficient of the polynomial surface. The square error, E, between the actual surface (pixel values), $F_{x,y}$, and the fitted surface, $F(x,y)$, is defined as follows, $$E = \sum_{x=1}^{N} \sum_{y=1}^{M} \{F_{x,y} - F(x,y)\}^2, \qquad (2)$$

where N and M indicate the matrix size in the x and y directions, respectively. In order to minimize E, the following equations are obtained, $$\frac{\partial E}{\partial a_i} = 0, i = 1, 2, \ldots \frac{(n+1)(n+2)}{2} \qquad (3)$$

-continued $$\sum_{s=1}^{n+1} \sum_{t=1}^{s} \left\{ \sum_{x=1}^{N} \sum_{y=1}^{M} x^{s=t+k-m} y^{t+m-2} \right\} \frac{a_{(s-1)s}}{2} + t = \qquad (4)$$

$$\sum_{x=1}^{N} \sum_{y=1}^{M} x^{k-m} y^{m-1} F_{x,y},$$

where $m=1,2,\ldots k$, and $k=1,2,\ldots,n+1$. Equation (4) can be expressed by a Matrix operation as follows, $$BA = C \qquad (5),$$

where $$B = \begin{bmatrix} \Sigma\Sigma 1 & \Sigma\Sigma x & \Sigma\Sigma y & \Sigma\Sigma x^2 & \Sigma\Sigma xy & \Sigma\Sigma y^2 & \ldots & \Sigma\Sigma y^n \\ \Sigma\Sigma x & \Sigma\Sigma x^2 & \Sigma\Sigma xy & \Sigma\Sigma x^3 & \Sigma\Sigma x^2 y & \Sigma\Sigma xy^2 & \ldots & \Sigma\Sigma xy^n \\ \Sigma\Sigma y & \Sigma\Sigma xy & \Sigma\Sigma y^2 & \Sigma\Sigma x^2 y & \Sigma\Sigma xy^2 & \Sigma\Sigma y^3 & \ldots & \Sigma\Sigma y^{n+1} \\ \Sigma\Sigma x^2 & \Sigma\Sigma x^3 & \Sigma\Sigma x^2 y & \Sigma\Sigma x^4 & \Sigma\Sigma x^3 y & \Sigma\Sigma x^2 y^2 & \ldots & \Sigma\Sigma x^2 y^n \\ \Sigma\Sigma xy & \Sigma\Sigma x^2 y & \Sigma\Sigma xy^2 & \Sigma\Sigma x^3 y & \Sigma\Sigma x^2 y^2 & \Sigma\Sigma xy^3 & \ldots & \Sigma\Sigma xy^{n+1} \\ \Sigma\Sigma y^2 & \Sigma\Sigma xy^2 & \Sigma\Sigma y^3 & \Sigma\Sigma x^2 y^2 & \Sigma\Sigma xy^3 & \Sigma\Sigma y^4 & \ldots & \Sigma\Sigma y^{n+2} \\ \vdots & \vdots & \vdots & \vdots & \vdots & \vdots & & \vdots \\ \Sigma\Sigma y^n & \Sigma\Sigma xy^n & \Sigma\Sigma y^{n+1} & \Sigma\Sigma x^2 y^n & \Sigma\Sigma x^2 y^{n+1} & \Sigma\Sigma y^{n+2} & \ldots & \Sigma\Sigma y^{2n} \end{bmatrix}$$

$$A = \begin{bmatrix} a_1 \\ a_2 \\ a_3 \\ a_4 \\ a_5 \\ a_6 \\ \vdots \\ a_{\frac{(n+1)(n+2)}{2}} \end{bmatrix},$$

$$C = \begin{bmatrix} \Sigma\Sigma F_{xy} \\ \Sigma\Sigma x F_{x,y} \\ \Sigma\Sigma F_{x,y} \\ \Sigma\Sigma x^2 F_{x,y} \\ \Sigma\Sigma xy F_{x,y} \\ \Sigma\Sigma y^2 F_{x,y} \\ \vdots \\ \Sigma\Sigma y^n F_{x,y} \end{bmatrix}$$

Therefore, the matrix of the coefficients, A, is derived from the following matrix operation, $$A = B^{-1} C \qquad (6),$$

where $B^{-1}$ is the inverse matrix of matrix B.

Figure 11:
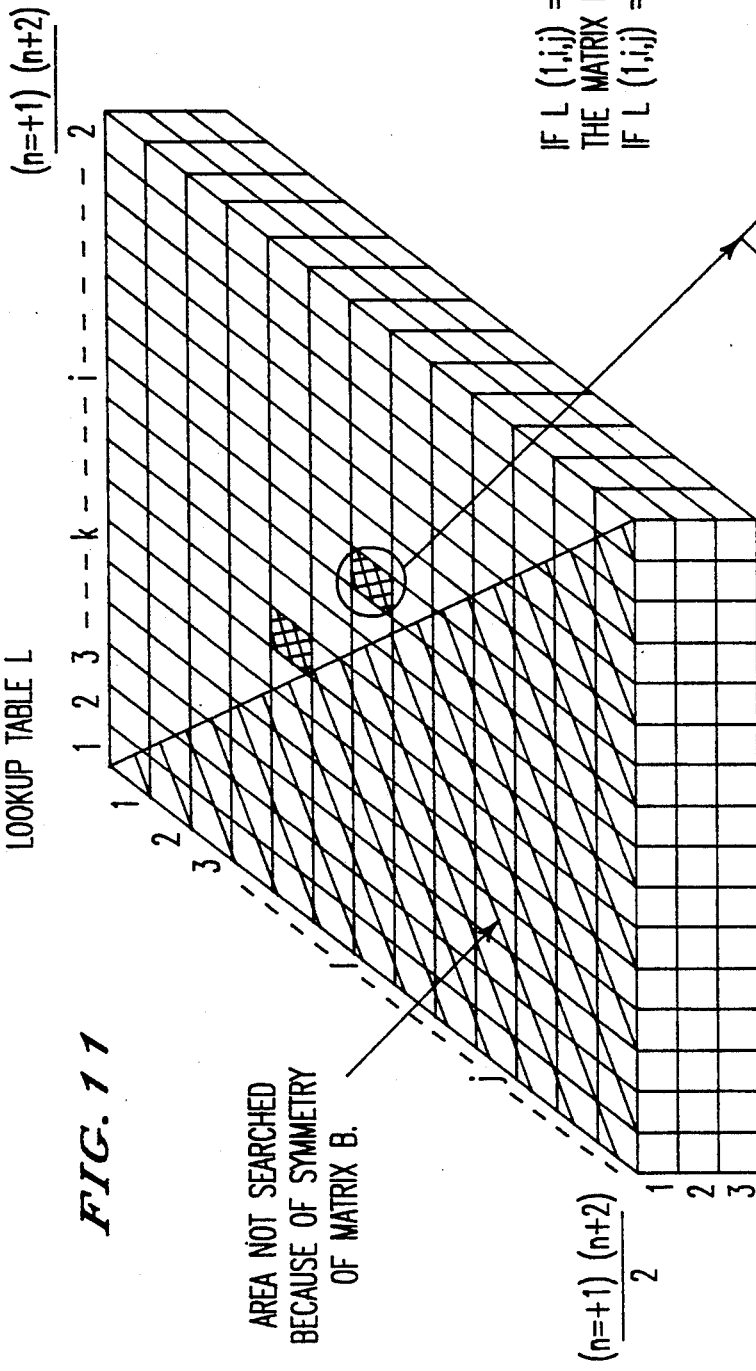
FIG. 11 shows a first lookup table L used in performing background trend correction for any order polynomial function.

It should be noted that in equation (5), matrix B consists of only terms of all locations (x, y) in the ROI, but matrix C includes terms of pixel values ($F_{x,y}$). Therefore, when many ROIs with the same matrix size must be corrected at a given order of polynomial surface, $B^{-1}$ can be calculated before calculating C, and can be used repeatedly without recalculation of $B^{-1}$. In addition, matrix B is symmetrical and includes many elements with the same values. For example, the value of an element, B(4,1) of the matrix B, is equal to $\Sigma \Sigma x^2$, which is also equal to the values of two other elements B(1,4) and B(2,2). In order to reduce the number of calculations in matrix B, therefore, a lookup table is generated, as shown in FIG. 11. This table corresponds to matrix B, which indicates the powers of x and y, if an element of matrix B has different powers of x and y from those of other elements previously calculated. For example, the value in lookup table L(1,i,j) at a location (i,j) of the matrix element B(i,j) will be 1, and L(2,i,j) and L(3,i,j) will indicate p and q, respectively. Thus, the element of the matrix B is obtained by $B(i,j) = \Sigma \Sigma \, x^p y^q$. However, if an element of the matrix B has the same powers of x and y as those of an element previously calculated, the lookup table indicates the location of the matrix element with the same powers of x and y. In such case, the lookup table L(1,i,j) will be 0, and L(2,i,j) and L(3,i,j) will indicate k and l, respectively. Thus, the element of matrix B is obtained by $B(i,j) = B(k,l)$ without the need for recalculation.

As an alternative method, an improved lookup table L' was generated in order to further reduce the number of calculations in matrix B. The structure of lookup table L' is shown in FIG. 12. The elements of L' are defined by the following equation, $$L'(p,q) = \Sigma \Sigma \, x^p y^q \; (p+q \leq 2n) \qquad (7)$$

since p+q will always be less than or equal to 2n. The lookup table L' is calculated before determination of matrix B. If an element of matrix B includes terms x, y with powers, p and q, respectively, the elements of matrix B are obtained by $B(i,j) = L'(p,q)$ without the need for calculation. The number of elements to be calculated in the lookup table L' is the same as that in the lookup table L. However, since the size of the lookup table L' is small, the computer memory can therefore be saved considerably. In addition, with the use of lookup table L', the numerous verification processes which are required by examining the content of the lookup table L can be avoided, which results in a shorter CPU processing time. For example, in the case of a 10th-order polynomial surface, it would be necessary to calculate 2,211 elements to generate matrix B. However, if one of lookup tables L or L' were used, only 231 elements need to be calculated in order to produce matrix B. Therefore, the number of elements to be calculated in matrix B can be substantially reduced by the above-described method. The search of powers, p and q, of x and y thus will only use addition and subtraction of integers and therefore require a short CPU processing time. On the other hand, it would take an extremely long CPU processing time to calculate $x^p y^q$.

Figure 13:
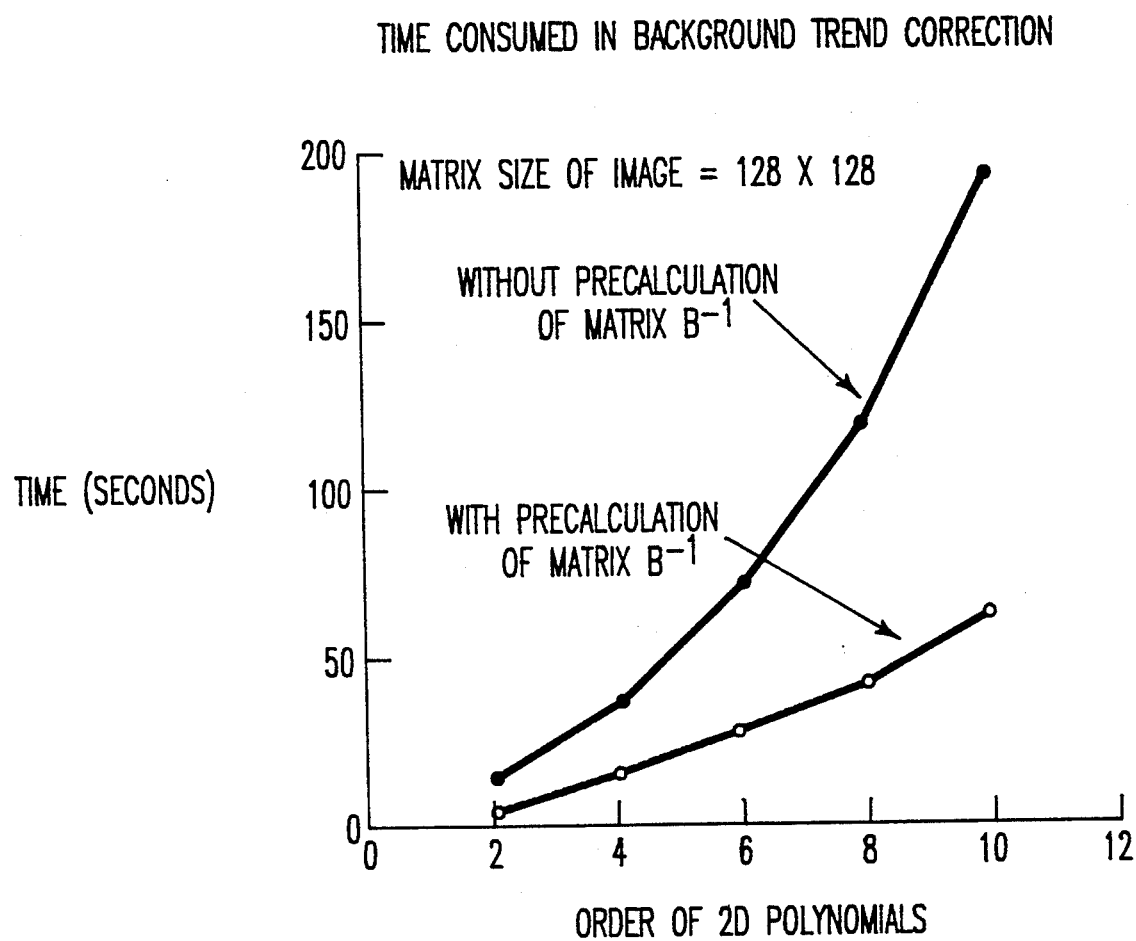
FIG. 13 illustrates the reduction in processing times for performing background trend correction with and without the use of a lookup table.

Also, if another type of lookup table is generated which corresponds to the inverse matrix $B^{-1}$, which is similar to equation (7), this inverse matrix $B^{-1}$ could be directly determined without the need for calculation of matrix B. It is important to use these features of matrix B in order to decrease the computation time for nonuniform background trend correction in large ROIs. FIG. 13 shows a comparison of the computation time for a ROI with a 128×128 matrix size with and without the use of lookup table L. It is apparent that a significant reduction in computation time can be realized by pre-calculating matrix $B^{-1}$.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A computer assisted method for determining geometric pattern features of interstitial infiltrates, including lump and linear opacities in a digitized chest image of a patient's lungs, comprising the steps of:
   a) obtaining said digitized chest image;
   b) performing texture analysis on said digitized chest image in order to detect abnormality regions in said image;
   c) classifying the patient's lungs as being normal or abnormal on the basis of said lung texture analysis;
   d) selecting a plurality of regions of interest (ROIs) so as to surround one or more of said abnormality regions detected during texture analysis;
   e) applying non-uniform background trend correction to said selected ROIs;
   f) performing first and second types of filtering to said background trend corrected image for detection of lump opacities and linear opacities, respectively;
   g) eliminating detected linear opacities which overlap with said lump opacities within said ROIs;
   h) classifying said detected lump and linear opacities into nodular, reticular, or reticulo-nodular patterns on the basis of calculated parameters corresponding to the three types of patterns.

2. The method according to claim 1, wherein said step of classifying said detected lump and linear opacities comprises determining a parameter corresponding to the types of said lump and linear opacities, said parameter being equal to a ratio of the area of a selected opacity to the area of an ROI including said selected opacity.

3. The method according to claim 1, wherein said first type of filtering comprises the steps of:
   a) obtaining binary images of said background trend corrected image by applying a thresholding process to the trend corrected image at predetermined pixel intervals;
   b) performing morphological filtering of said binary images; and
   c) applying a feature extraction technique to said morphologically filtered images.

4. The method according to claim 1, wherein said second type of filtering comprises the steps of:
   a) performing line enhancement filtering of said background trend corrected image; and
   b) applying a thresholding process to the line enhancement filtered image.

5. The method according to claim 3, wherein said step of performing feature extraction includes determining circularity and edge gradient characteristics of said lump opacities.

6. The method according to claim 4, wherein said step
   of performing line enhancement filtering of the background trend corrected image comprises the step of determining a maximum output value from a single detection template included in a plurality of detection templates, said maximum output value indicating a direction in which a linear opacity is oriented with respect to relative orientations of said plurality of detection templates.

7. The method according to claim 1, wherein step (e) comprises the steps of:
   a) generating a lookup table in the form of a first matrix of values having a 2n×2n size wherein n equals an order of a function describing a polynomial surface to be used for said background trend correction in a selected ROI;

b) generating a second matrix using corresponding values included in said lookup table to determine all values of said second matrix;

c) generating a third matrix equal to the inverse matrix of said second matrix;

d) calculating a fourth matrix of coefficients;

e) generating said function describing the nth order polynomial surface using the coefficients of said fourth matrix; and f) subtracting the nth order function from image data included in said selected ROI.

8. The method according to claim 7, wherein the step of generating said lookup table comprises calculating the contents of a location (p,q) in said lookup table, said contents being determined by $\Sigma\Sigma x^p y^q$, where $p+q \leq 2n$, and (x,y) is a corresponding location in said selected ROI.

9. The method according to claim 7, wherein the step of generating said second matrix comprises identifying contents in said lookup table which correspond to each location (x,y) of the second matrix based on the powers (p,q) for each (x,y) value of said second matrix.

10. The method according to claim 7, wherein said fourth matrix of coefficients corresponds to matrix A, said third matrix corresponds to matrix $B^{-1}$ and said fourth matrix corresponds to matrix C in the equation $A = B^{-1}C$, where C corresponds to the matrix containing image data of the (x,y) locations in said selected ROI.

11. Computer assisted a method for determining geometric pattern features of interstitial infiltrates, including lump and linear opacities, in digitized chest images, comprising the steps of:

a) obtaining a digitized chest image;

b) selecting a plurality of regions of interest (ROIs) each corresponding to one or more of said adjacent pixels;

c) background trend correcting said chest image;

d) morphological filtering said background trend corrected image in order to detect lump opacities in said background trend corrected image using a feature extraction technique;

e) line enhancement filtering of said background trend corrected image in order to detect linear opacities in said background trend corrected image;

f) eliminating said detected linear opacities which overlap with said detected lump opacities;

g) classifying said detected opacities by determining parameters corresponding to the type of each opacity, said parameters being equal to ratios of the areas of selected opacities to the area of ROIs including said selected opacities.

12. A system for determining geometric pattern features of interstitial infiltrates, including lump and linear opacities in a digitized chest image of a patient's lungs, for use with a computer, comprising:

means for obtaining said digitized chest image;

means for performing texture analysis on said digitized chest image in order to detect abnormality regions;

means for classifying the patient's lungs as being normal or abnormal on the basis of said lung texture analysis;

means for selecting a plurality of regions of interest (ROIs) so as to surround one or more of said abnormality regions detected during texture analysis;

means for applying a non-uniform background trend correction to said digitized image;

means for performing first and second types of filtering to said background trend corrected image for detecting of lump opacities and linear opacities, respectively;

means for eliminating said detected linear opacities which overlap with said lump opacities within said ROIs;

means for classifying said detected lump and linear opacities into nodular, reticular, or reticulo-nodular patterns on the basis of calculated parameters corresponding to the three types of patterns.

13. The system according to claim 12, wherein said means for classifying said detected lump and linear opacities includes a means for determining parameters corresponding to types of said opacities, said parameters being equal to ratios of the areas of selected opacities to the areas of ROIs including said selected opacities.

14. The system according to claim 12, wherein said means for performing said first type of filtering comprises:

means for obtaining binary images of said background trend corrected image by applying a thresholding process to the trend corrected image at predetermined pixel intervals;

means for performing morphological filtering of said binary images; and means for applying a feature extraction technique to said morphological filtered images.

15. The system according to claim 12, wherein said means for performing said second type of filtering comprises:

means for performing line enhancement filtering of said background trend corrected image; and means for applying a thresholding process to the line enhancement filtered image.

16. The system according to claim 14, wherein said means for performing feature extraction includes means for determining circularity and edge gradient characteristics of said lump opacities.

17. The system according to claim 15, wherein said means for performing line enhancement filtering of the background trend corrected image comprises means for determining a maximum output value from a single detection template included in a plurality of detection templates, said maximum output value indicating a direction in which a linear opacity is oriented with respect to relative orientations of said plurality of detection templates.

18. A system for determining geometric pattern features of interstitial infiltrates, including lump and linear opacities in chest images, for use with a computer, comprising:

means for obtaining a digitized chest image in order to form a grid of adjacent pixels covering a selected portion of the chest image;

means for selecting a plurality of regions of interest (ROIs) each corresponding to one or more of said adjacent pixels;

means for performing background trend correction of said image;

means for performing morphological filtering said background trend corrected image in order to detect lump opacities in said background trend corrected image using a feature extraction technique;

means for line enhancement filtering of said background trend corrected image in order to detect linear opacities in said background trend corrected image;

means for eliminating said detected linear opacities which overlap with said detected lump opacities;

means for classifying said detected lump and linear opacities by determining parameters corresponding to types of said opacities, said parameters being equal to ratios of the areas of selected opacities to the areas of ROIs including said selected opacities.

* * * * *

UNITED STATES PATENT AND TRADEMARK OFFICE
CERTIFICATE OF CORRECTION

PATENT NO. : 5,319,549
DATED : June 7, 1994
INVENTOR(S) : Shigehiko Katsuragawa, et al It is certified that error appears in the above-indentified patent and that said Letters Patent is hereby corrected as shown below:

Column 1, line 7, please insert the following:
--The present invention was made in part with U.S. Government support under grant numbers USPHS CA24086 and CA 47043 from the National Institutes of Health. The U.S. Government has certain rights in the invention.--

Signed and Sealed this

Thirteenth Day of September, 1994

Attest:

BRUCE LEHMAN

Attesting Officer

Commissioner of Patents and Trademarks